US005317798A

United States Patent [19]

Thompson et al.

[11] Patent Number: 5,317,798

[45] Date of Patent: Jun. 7, 1994

[54] METHOD OF MANUFACTURING BOX LADDERS

[75] Inventors: Michael S. Thompson, Willowdale; Frank Binder, Scarborough; Frederick A. Leech, Gormley, all of Canada

[73] Assignee: Featherlite Industries Ltd., Ontario, Canada

[21] Appl. No.: 847,288

[22] Filed: Mar. 10, 1992

[30] Foreign Application Priority Data

Mar. 13, 1991 [CA] Canada .............................. 2.038.187

[51] Int. Cl.[5] .............................................. B23P 11/02

[52] U.S. Cl. ...................................................... 29/453

[58] Field of Search ......................... 29/453, 512, 523; 182/228, 194, 156

[56] References Cited

U.S. PATENT DOCUMENTS 2,776,080 1/1957 Hopfeld .......................... 182/228 X
4,219,102 8/1980 Ducresot et al. ............... 182/228 X
4,261,436 4/1981 Stillman, Jr. ..................... 29/512 X

*Primary Examiner*—Mark Rosenbaum
*Assistant Examiner*—Khan V. Nguyen
*Attorney, Agent, or Firm*—Riches, McKenzie & Herbert

[57] ABSTRACT

A method of manufacturing box ladders having a pair of side rails and rungs wherein each of the side rails are assembled from a pair of section members having holes pre-formed prior to assembly of the side rail. The method provides reduced deformation in the manufacture of box ladders having cylindrical rungs and provides for the manufacture of box ladders having non-cylindrical shaped rungs.

15 Claims, 6 Drawing Sheets

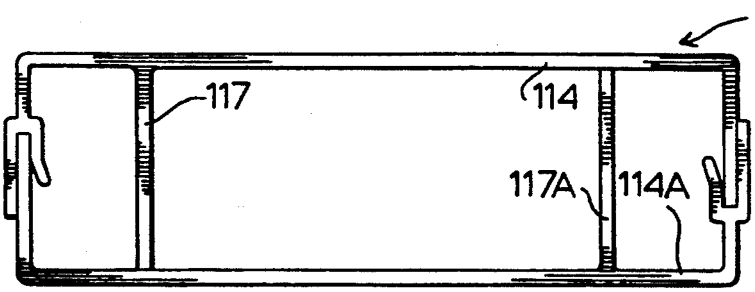
FIG. 5A.
FIG. 5B.
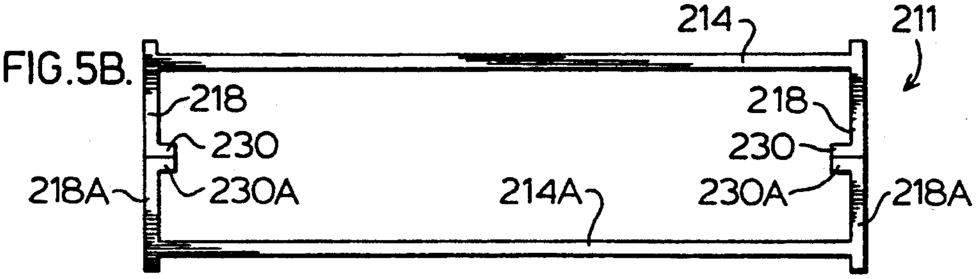
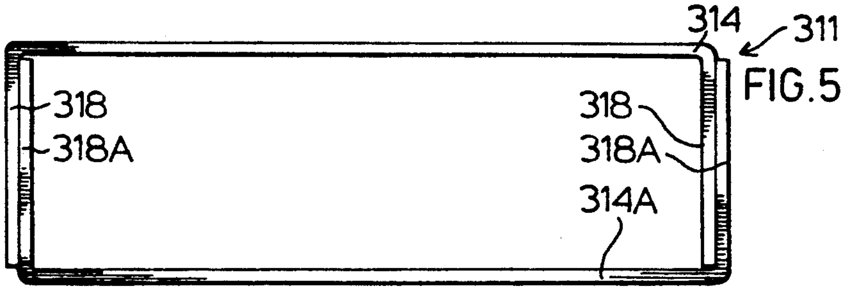
FIG. 5C.
FIG. 5D.
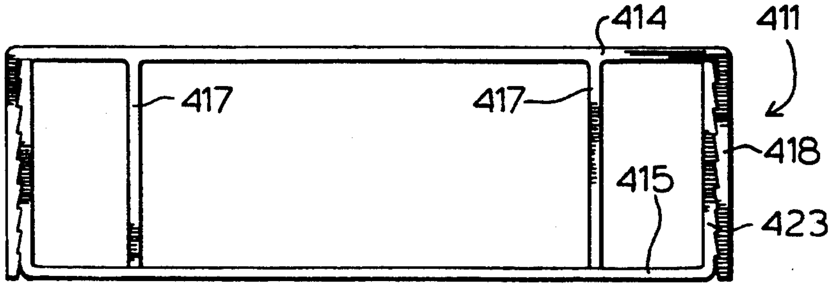
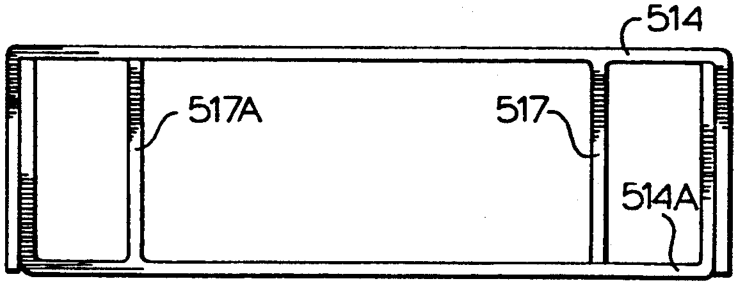
FIG. 5E.
FIG. 5F.
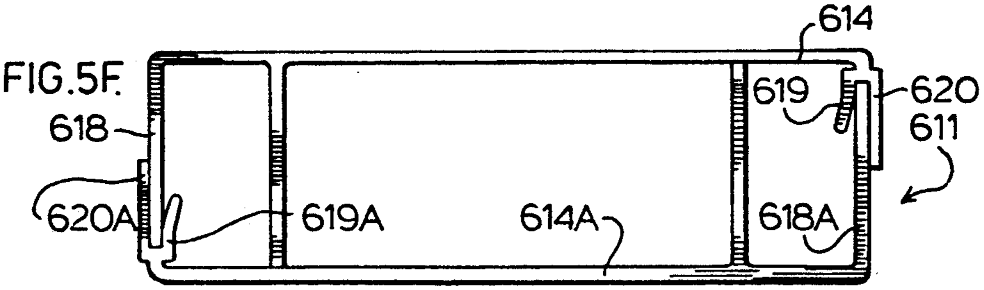

METHOD OF MANUFACTURING BOX LADDERS

FIELD OF THE INVENTION

This invention relates to ladders and more particularly to box ladders and methods of manufacture thereof.

BACKGROUND OF THE INVENTION

Ladders formed of extruded aluminum, fibreglass or composite materials and comprising a pair of open C-shaped side rails and cylindrical or non-cylindrical shaped rungs are known. In the manufacture of such ladders having cylindrical rungs, each rung is inserted into round holes which have been drilled or stamped out of the side rail, and swaged therein for retention.

A major drawback of ladders having cylindrical rungs is that the rungs tend, upon continuous use, to rotate within the hole of the side rail. Another drawback is that the curved step surface of the cylindrical rung is conducive to allow of slipping by the climber and, thus, requires more attention when the climber is climbing up or merely standing on the rung.

To overcome these safety drawbacks of cylindrical rungs, non-cylindrically shaped rungs have been developed. One preferred form is the D-shaped rung, known as the D-rung. In a D-rung ladder, the rungs are set into a D-shaped aperture in the side rail with the flat side of the rung positioned at an angle, typically 15°, to the horizontal plane of the ladder when the ladder is held upright, such that when the ladder is leaned against a vertical surface, the flat or step side of the D-rung is substantially horizontal and parallel to the ground. In addition, this type of rung provides more safety in that it cannot rotate within its hole in the side rail and provides more comfort to a person standing on the rung for an extended period of time.

It will be appreciated that non-round holes cannot be drilled in ladder side rails and are generally made by stamping or punching out the desired shape in the C-side rail by means of a punch press assembly.

Extruded aluminum ladders having side rails of hollow, closed, generally rectangular form are known as box ladders. Within the term "box ladder", is also included, for example, side rails of a square, round or oval cross-sectional form. These box ladders, because of their greater inherent strength, are preferred over C-side rail ladders.

While it is relatively straight forward to produce round holes in box side rails by drilling, it is more difficult to economically provide non-round holes along the length of the box side rail by stamping, punching and the like, without some deformation of the box, even with use of a mandrel. Further, use of a mandrel in a stamping operation to stamp out holes in box side rails becomes increasingly difficult as the length of the side rail increases. Increased mandrel weight considerations, high tolerance requirements and physical manipulations of the punch press, dies and the like, make the manufacture of box side rails having non-round holes economically unattractive for ladder lengths greater than 6 feet. For these reasons, the acceptance of the more safer, non-cylindrical rung ladders, particularly the D-rung ladder, has been reduced.

It is an object of the present invention to provide a box side rail ladder having non-cylindrical rungs.

It is a further object of the invention to provide an improved method of manufacturing a box side rail ladder.

It is yet a further object of the invention to provide a method of manufacturing a box side rail ladder having non-cylindrical rungs.

In its simplest aspect, the invention provides a method of manufacture of cylindrical and non-cylindrical rung box ladders from the assembly of a pair of box side rails and rungs wherein each box side rail is assembled from two lengths of section members each having pre-formed holes intermittent along their lengths.

Accordingly, in its broadest aspect, the invention provides a method of manufacturing a box rail ladder having a first rectangular side rail, a second rectangular side rail and a plurality of rungs, which method comprises forming a series of holes intermittent along the length at pre-determined intervals of a first C-shaped section member;

forming a series of holes intermittent along the length at pre-determined intervals of a second C-shaped section member;

mating said first and second section members to form said first rectangular side rail;

mating said first and second section members to form said second rectangular side rail; and mating said first and second side rails with said rungs to form said box rail ladder.

Preferably, the invention provides a method of manufacturing a box rail ladder as hereinabove defined wherein said rungs and said holes are non-cylindrical and, more preferably, D-shaped.

The first and second elongated C-shaped section members are generally made of a composite material, fibreglass or of aluminum extruded into appropriate lengths.

The invention, thus, generally provides a method of manufacture of a box ladder having a pair of box side rails, which side rails are formed from two halves of a side rail wherein each of the halves is pre-punched before assembly and which, upon assembly, form a substantially rectangular box section with holes, preferably, non-round holes, to receive the rungs; and box ladders made thereby.

In preferred forms, any non-cylindrically shaped rung having a shape which interferes with rotation of the rung in the side rail hole may be of use in the present invention. However, regard should be had to the utility of such a shape as a rung of a ladder.

A shaped rung providing a flat upper surface to the feet of a user, and, optionally, provided with serrations, is preferred. Examples of preferred rung shapes are triangular-shaped, square-shaped, rhomboidal-shaped and D-shaped rungs.

In the method according to the invention, the holes in a pair of mateable section members are preferably formed by stamping or punching out the members simultaneously. This operation can be readily achieved by positioning the pair of members in a "back-to-back" position wherein the flat body portion of the members fully abut each other. This feature allows for the use of a single punching action for each pair of corresponding holes and, thus, a reduction in capital equipment cost, and a better series of hole alignments.

Each pair of corresponding holes may be formed simultaneously as the other pairs of holes by a stamping operation along the lengths of the pair of abuting section members; but, preferably, each pair of corresponding holes are formed in individual stamping operations.

Thus, it can be seen that the above method provides for the relatively simple and economic manufacture of significant lengths of box ladder without the problem of deformation effected by stamping of a pre-formed rectangular box side rail.

In a further aspect, the invention provides cylindrical and non-cylindrical rung box ladders comprising a pair of box side rails and a plurality of cylindrical or non-cylindrical rungs wherein said box side rails are each formed of a first section member and a second section member engaged therewith.

BRIEF DESCRIPTION OF THE DRAWINGS

In order that the invention may be better understood, preferred embodiments will now be described by way of example only with reference to the accompanying drawings wherein

FIGS. 5A–5G show end views of alternative embodiments of side rails of use in box ladders according to the invention;

DESCRIPTION OF THE PREFERRED EMBODIMENTS

Figure 1:
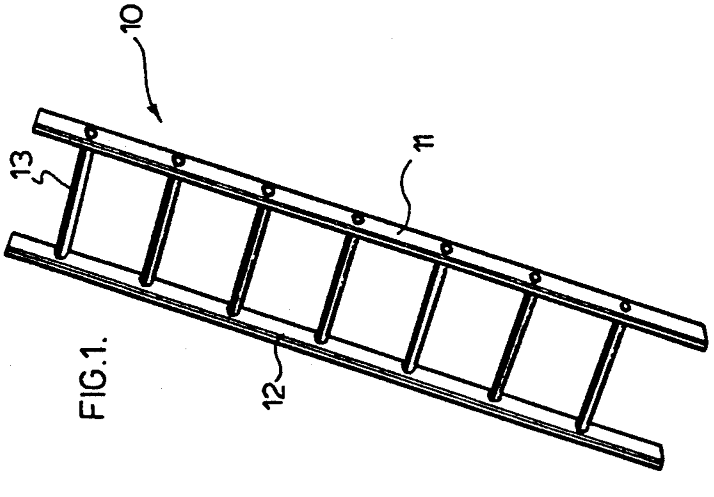
FIG. 1 shows a perspective view of a box ladder according to the invention.

Ladder 10 shown in FIG. 1 has a first rectangular side rail 11, a second rectangular side rail 12 and a plurality of D-rungs 13.

Figure 2:
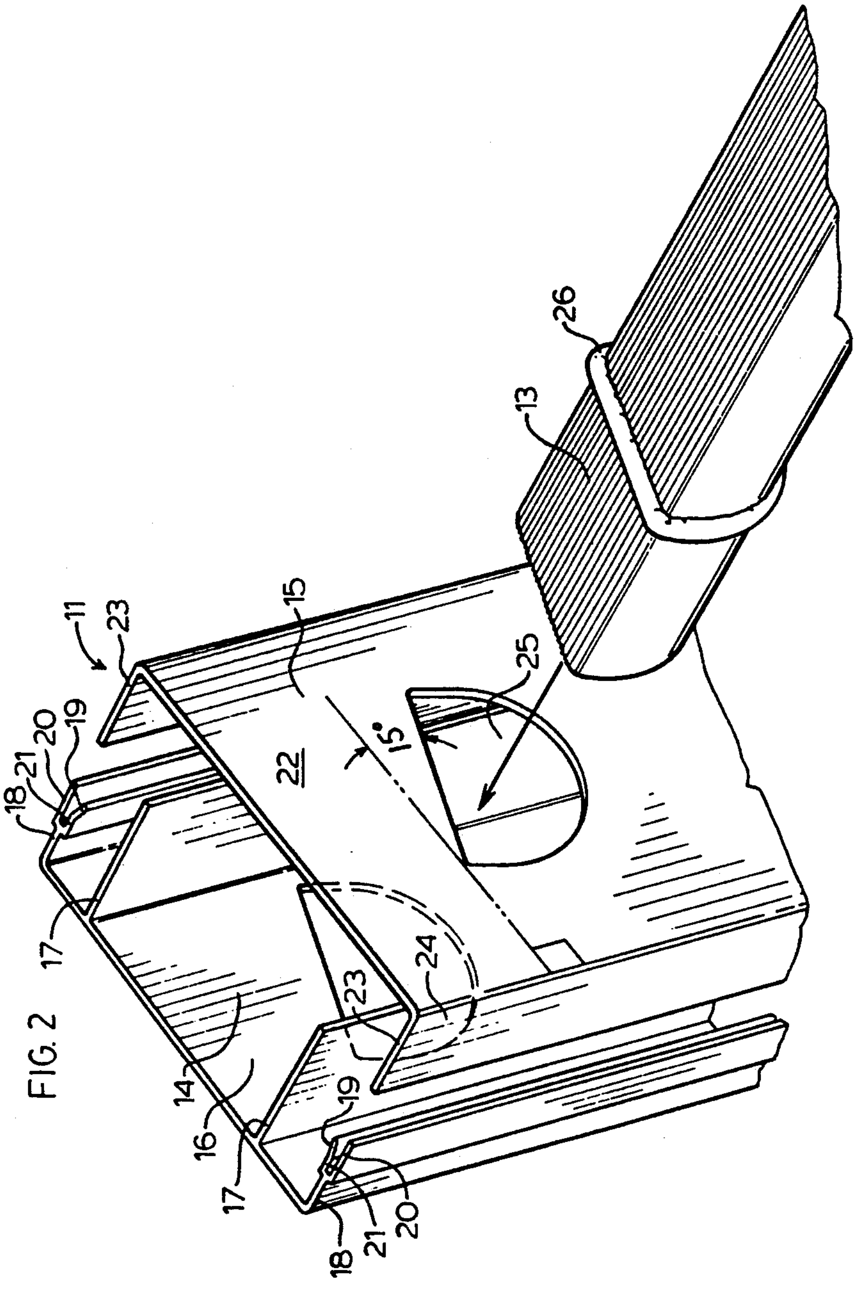
FIGS. 2, 2A and 2B show partial, exploded, perspective views of side rails and rungs, prior to full assembly, of box ladders according to the invention.

With particular reference to the embodiment of FIG. 2, side rail 11 is formed of a first C-shaped section member 14 and a second C-shaped section member 15 mateable therewith. Member 14 has a flat body 16, a pair of integrally formed support ribs 17 along its length and a pair of arms 18.

Each of arms 18 is split into uneven inner and outer fingers 19 and 20, respectively, and which are provided with barbs. In the embodiment shown, outer fingers 20 are of greater length than inner fingers 19, which fingers 19 are provided with a gentle guidance splay away from respective finger 20. Fingers 19, 20 adjacent their junction define a slot 21 along the length of member 14.

Member 15 has a flat body 22 and a pair of arms 23 having a barbed end portion of a suitable thickness to be received in mating engagement by slots 21.

The lengths of support ribs 17 in the direction towards member 15 are such that ribs 17 abut body 22 to provide maximum support to the resultant side rail while allowing full disposition of arms 23 in slots 21.

Each of bodies 14 and 22 has a plurality of D-shaped holes 24, 25 respectively, so aligned and adapted as to receive a plurality of D-rungs 13 when members 14, 22 are mated, with the flat surface of D-ring 13 uppermost and at an approximately 15° angle to the horizontal of side rails 11, 12.

Figure 3:
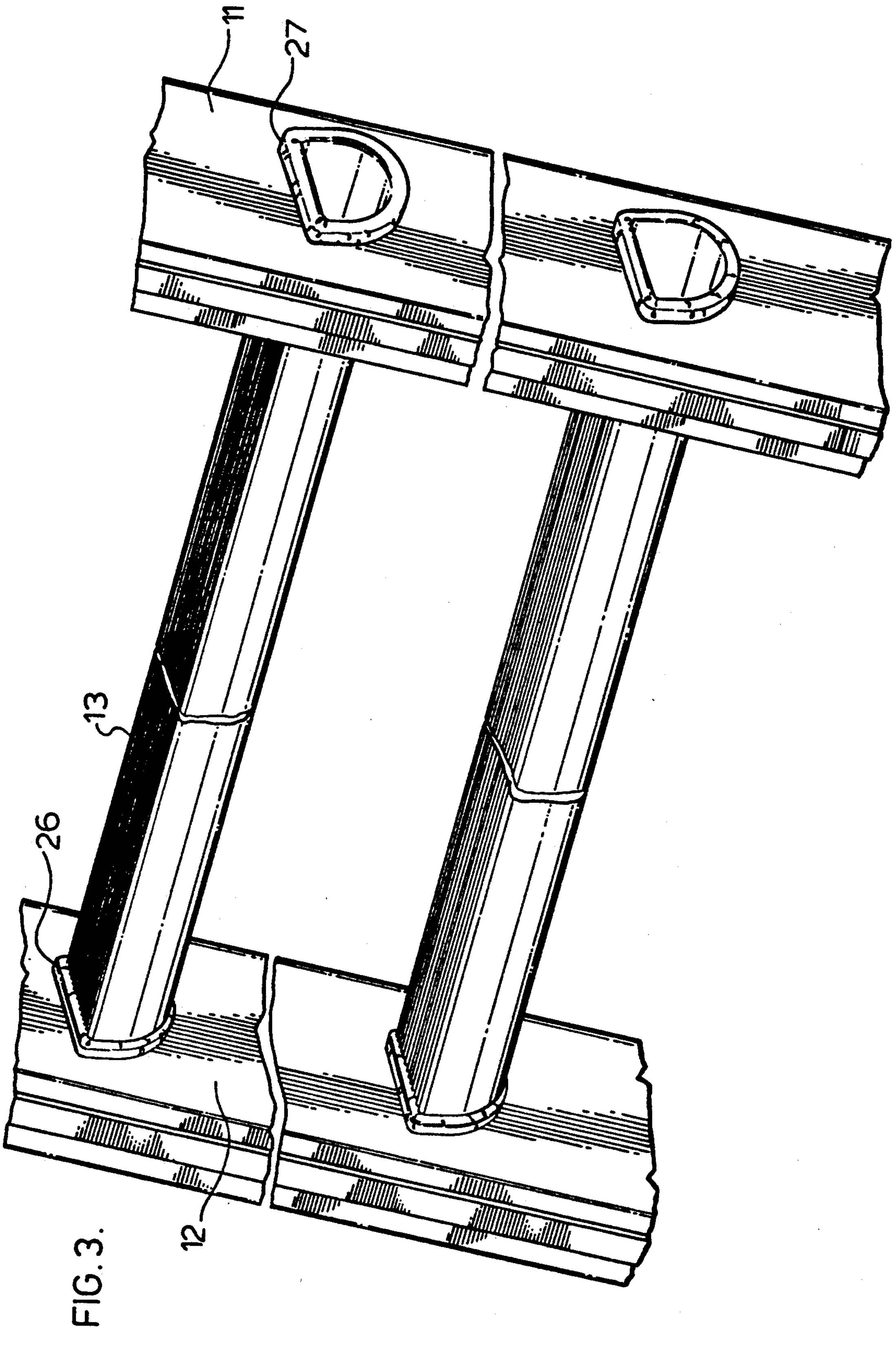
FIG. 3 shows a partial perspective view of a length of a box ladder according to the invention.
Figure 4:
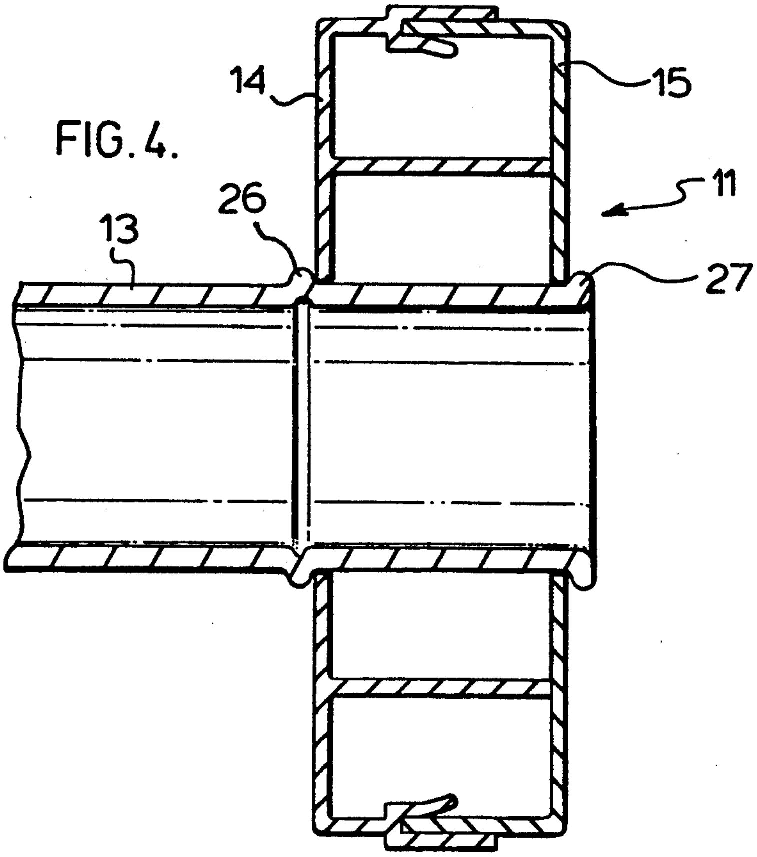
FIG. 4 shows a cross-section, in part, of a side rail and rung of a box ladder according to the invention.

With reference to FIGS. 3 and 4, each of D-rungs 13 adjacent each of its ends has a pair of inner upset shoulders 26 and a pair of outer upset shoulders 27, to restrict lengthwise movement of D-rungs 13 in their holes.

The box ladder is manufactured as follows using machine tools standard in the engineering industry. Extruded aluminum members 14, 15 are rigidly held in a stamping press assembly with bodies 16, 22 in adjacent abutting relationship. This "back-to-back" arrangement allows of stability, precise alignment of the members, and the need for only a single punch operation. D-shaped holes 24, 25 are punched at pre-determined intervals into members 14, 15, respectively, by means standard in the engineering art. Members 14, 15 are released, rotated and mated by insertion of arms 23 into slots 21 such that D-shaped holes 24, 25 are superimposed and so aligned as to receive a D-rung to form side rails 11. In an analogous manner, side rail 12 is made.

An appropriate length of D-shaped extruded aluminum suitable for manufacture into a ladder rung 13 is formed with a pair of swaged inner upset shoulders 26 by means of a nose and cone press tool standard in the engineering art, and in a manner analogous to the manufacture of round rung ladders. The appropriate length of extruded aluminum is chosen as hereinafter described.

D-rungs 13 are fitted through holes 24, 25 of a pair of side rails 11, 12 and are of a suitable length to allow a sufficient protrusion through holes 24 whereby swaged outer upset shoulders 27 are formed by means of a nose and cone swaging press tool standard in the industry and in a manner analogous to the manufacture of round rung ladders. In this manner, a full length of ladder may be assembled. In an alternative to upset swaging the rungs to the side rails the rungs may be welded to the side rails.

Prior to upset swaging or welding the rungs to the side rails, in an alternative embodiment each of the rungs at its ends may be tapered so as to provide a tight wedged fit when fitted within the holes of the side rail.

The method of the invention is of particular value in the manufacture of D-rung box ladders of lengths of from 8–40 feet (2½ m–12 m).

Figure 2A:
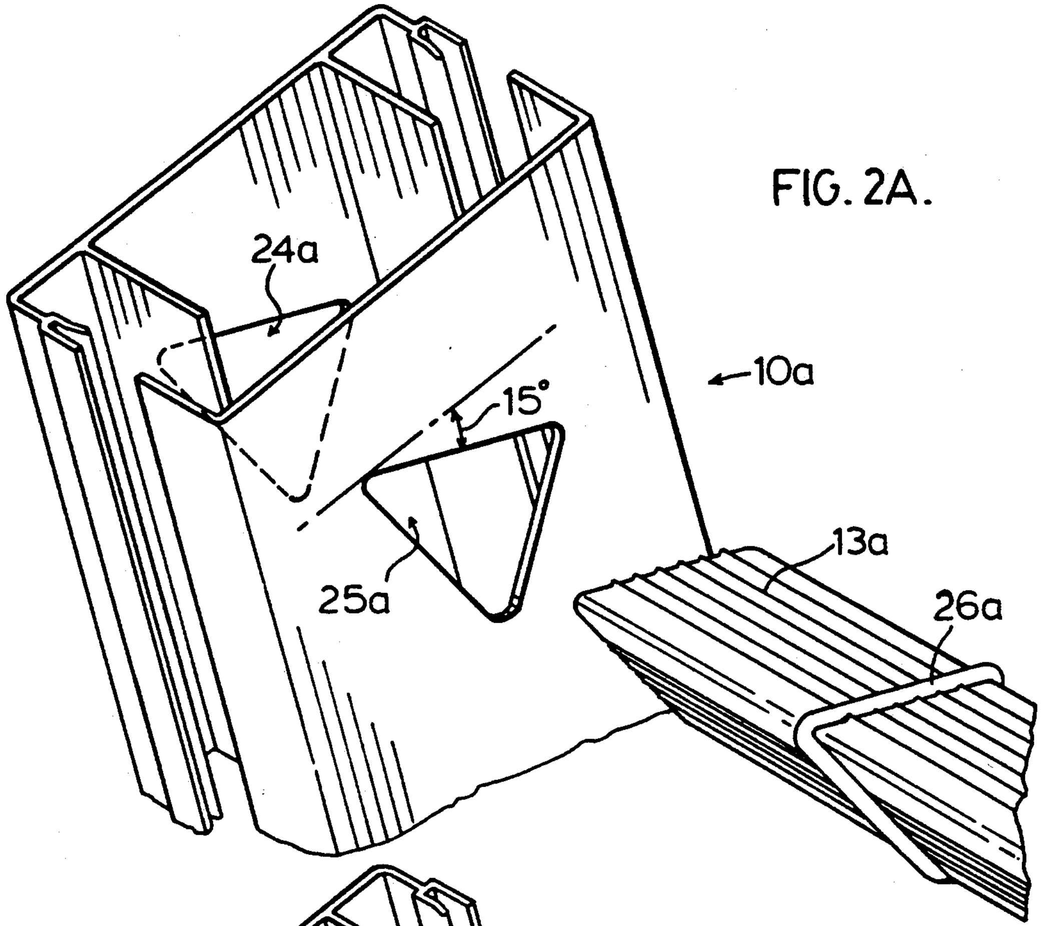

In a more preferred embodiment shown in FIG. 2A, ladder 10*a* has a plurality of isosceles triangular-shaped rungs, 13*a* and triangular-shaped holes, 24*a*, 25*a* to receive rungs 13*a* and inner upset shoulders, 26*a*. Each of the upper and side surfaces of rungs 13*a* has a plurality of serrations constituted by parallel raised portions to provide good gripping surfaces either for the feet of a person, when climbing or standing on the ladder, or for the hands, when the ladder is climbed. Triangular-shaped rungs provide the manufacturer the option of reducing the amount of material needed for a sturdy rung of a ladder according to the invention.

Figure 2B:
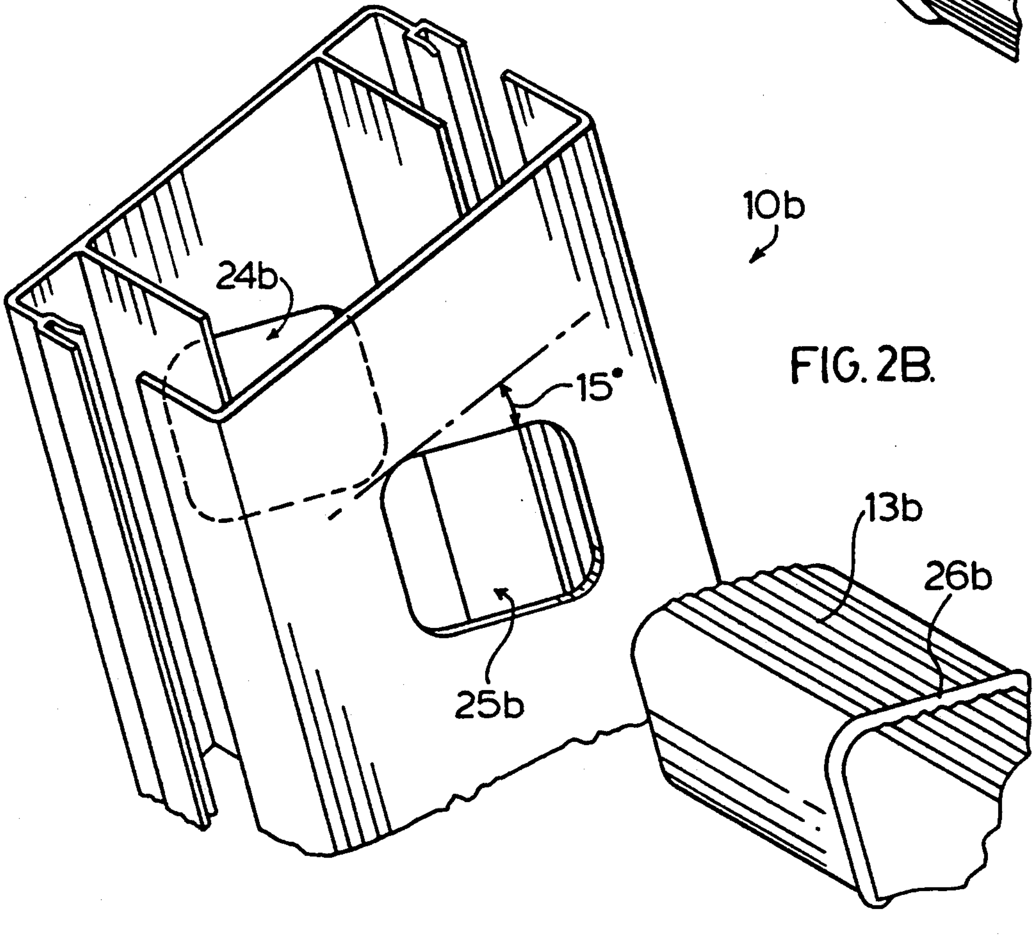

In the alternative embodiment shown in FIG. 2B, ladder 10*b* has a plurality of rhomboidal-shaped rungs 13*b*, rhomboidal shaped holes 24*b*, 25*b* and inner upset shoulders 26*b*. In this embodiment the rhomboidal-shaped rung has two pairs of parallel surfaces of non-equal lengths wherein the upper and lower surfaces are serrated and greater in length than the side surfaces.

In alternative embodiments, box side rails may be formed from alternatively shaped first and second section members. A non-limiting selection of such alternative section members are shown schematically in FIGS. 5A-5G.

FIG. 5A shows a side rail 111 formed of two identically formed section members 114, 114A, each having a single, integrally formed upstanding support rib 117, 117A, respectively, along the length of section members 114, 114A. Section members 114, 114A may be formed from a single piece of a double-length of extruded aluminum which is cut into two equal lengths, 114, 114A. Side rail 111 is distinguished over side rail 11 of the preferred embodiment shown in FIG. 4 in that section member 14, alone, has both integrally formed support ribs 17.

Section members 114, 114A may be held together in side rail 111 as described for section members 14 and 15 of side rail 11.

The embodiment side rail 211 of FIG. 5B has identical section members 214, 214A, which have neither integral support ribs, nor a finger and slot arrangement of fingers on arms 218, 218A, as seen in the preferred embodiment shown in FIG. 4. However, each of arms 218, 218A terminate in a flat abutting plate 230, 230A, respectively, which provides good contact between section members 214, 214A when side rail 211 is formed.

Section members 214, 214A may be held together, simply, by means of upset swaging shoulders or welding of the rungs in the side rail. This could be enhanced by spot welding plates 230, 230A, intermittent of the length of the side rail. Both of section members 214, 214A could be formed from a single piece.

Side rail 311 shown in FIG. 5C, is formed of two identically formed section members 314, 314A, having arms 318, 318A, respectively, which fit together in side rail 311 with the full length of arms 318 abutting 318A, each of one arm 318 and 318A being inside formed side rail 311. This side rail may be held together by similar means as in side rail 211, but also by rivets (not shown) intermittent the length of the side rail.

Side rail 411 shown in FIG. 5D, has non-identical section members 414, 415, wherein section member 414 has a pair of upstanding support ribs 417. Arms 418, 423 are provided with mating barbs on an inner surface and outer surface, respectively. Section member 415 is held within section number 414 by mating engagement of the corresponding barbs. The section members may be held together, also, by spot welds, rivets or upset swaging shoulders.

Side rail 511, shown in FIG. 5E takes the form of side rail 311 shown in FIG. 5C but with each of identical section members 514, 514A having an integrally formed upstanding support rib 517, 517A, respectively and with member 514A fitted within member 514. Each of section members 514, 514A may be formed from the same extended length of section member and cut to desired lengths, if the members have some resilient flexibility to enable member 514A to fit within member 514. Section members 514, 514A may be held, additionally, together in side rail 511 as described for side rail 311.

Side rail 611 shown in FIG. 5F has the form of side rail 111 of FIG. 5A except that side rail 611 has identical section members 614, 614A having arms 618, 618A, respectively, which have fingers 619, 619A, 620 and 620A, respectively, which are not central of arms 618, 618A, respectively. Side rail 611 may be formed with section members 614, 614A held together as for section members 114, 114A shown in FIG. 5A.

Figure 5G:
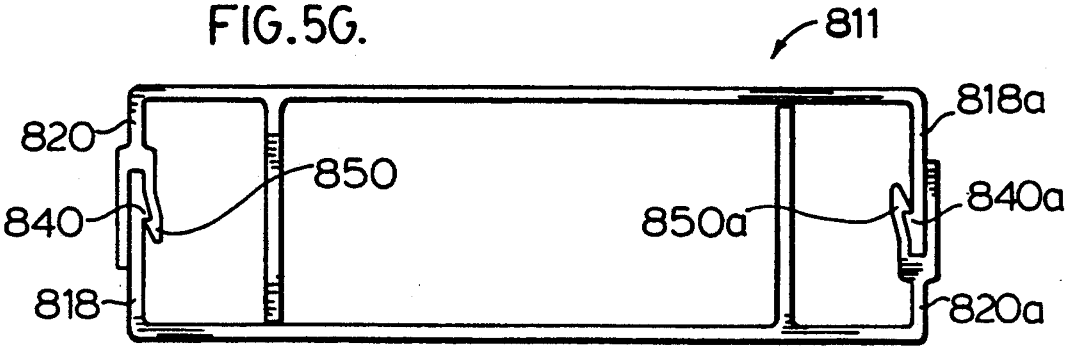

In a particularly preferred embodiment, side rail 811 shown in FIG. 5G has the form of side rail 111 of FIG. 5A, except that side rail 811 has arms 818 and 818A, having at their ends barbs 840, 840A, respectively, which mate with mating barbs 850, 850A respectively, of arms 820, 820A.

Thus, in some of the embodiments shown in FIGS. 5A-5G, the side rail section members as so formed as to not provide the intimate mating provided by slot retention. As hereinabove mentioned, these section members may be held together to form the box side rail, optionally, by means of rivets, spot welding and/or by only the presence of the swaged upset shoulders of the rungs.

Figure 6:
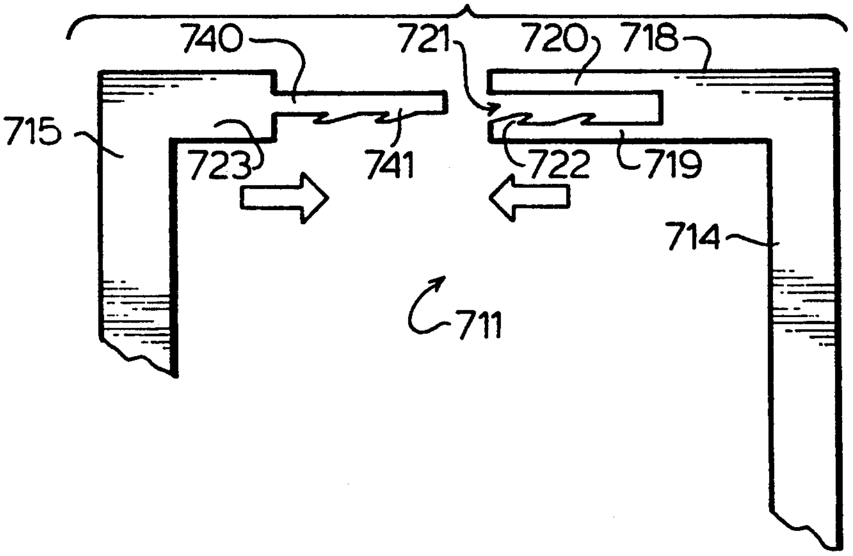
FIG. 6 shows a partial end view of an alternative embodiment of a dissembled side rail of a box ladder according to the invention.

An effective mating arrangement for section members is shown in FIG. 6, wherein section member 714 has arms 718 having a pair of equal length fingers 719, 720 defining a slot 721. Inner finger 719 has a series of barbs 722. Section member 715 has arm 723 having a single finger 740 having barbs 741 mateable with spurs 722 to provide good lockable engagement when finger 740 is inserted into slot 721.

Figure 7:
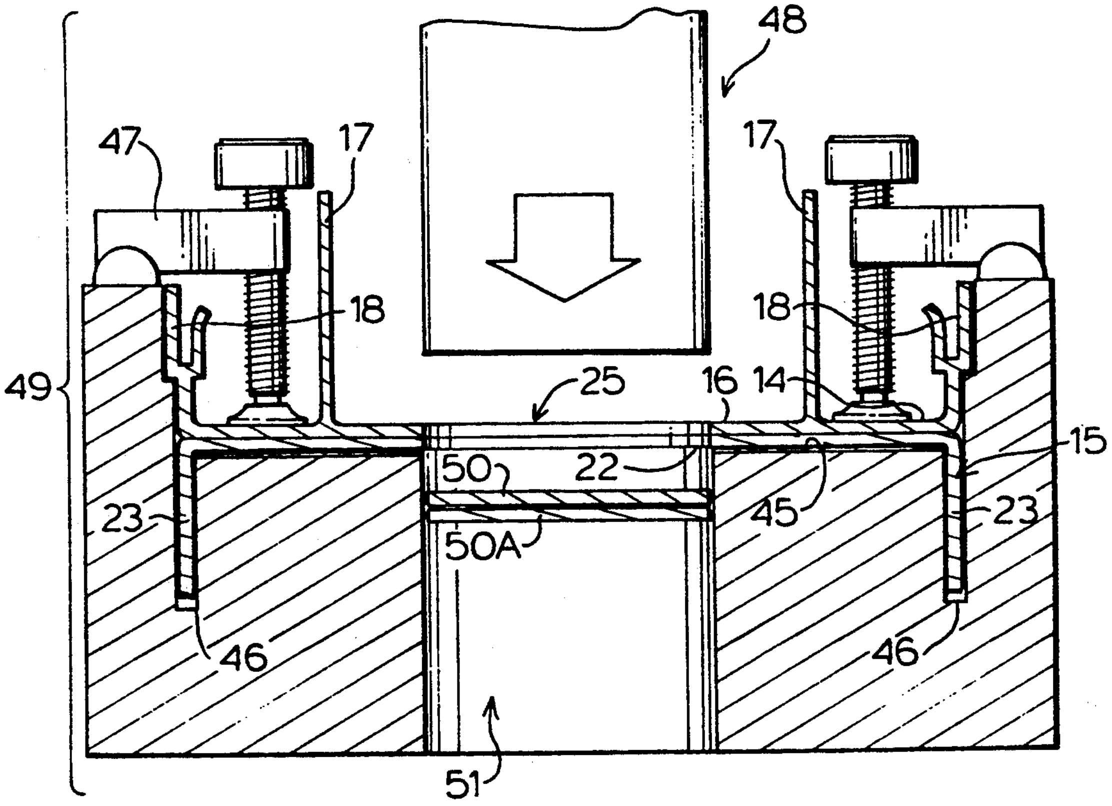
FIG. 7 shows a cross-sectional view, in part, of a die and press machine of use in the practice of the invention with a pair of corresponding section members as described in reference to FIG. 4.

To illustrate the preferred stamping step of the preferred process according to the invention reference is made to FIG. 7.

FIG. 7 shows a section member 15 resting on die shelf 45, with arms 23 downwardly positioned in die recesses 46.

Resting on section member 15 is section member 14, in a back-to-back relationship wherein flat bodies 22, 16 abut one another. Section members 14, 15 are rigidly held on die shelf 45 by die clamps 47 and so positioned as to allow a die 48 of die press 49 to stamp out in a precise manner, slugs 50, 50A, from section members 14, 15, respectively, out of slug hole 51.

The above apparatus provides for an advantageous single step stamping operation wherein corresponding holes are formed in section members 14, 15 in a single step. This produces precisely aligned holes and is made possible by use of the back-to-back abutting arrangement of the bodies of the section members.

The same swage technique may be used in the assembly and construction of each of the ladders according to the invention as hereinbefore described.

Although this disclosure has described and illustrated certain preferred embodiments of the invention, it is to be understood that the invention is not restricted to these particular embodiments. Rather, the invention includes all embodiments which are functional or mechanical equivalents of the specific embodiments and features that have been described and illustrated herein.

The embodiments of the invention in which an exclusive property and privilege is claimed are defined as follows:

1. A method of manufacturing a box ladder having a first rectangular box-shaped side rail, a second rectangular box-shaped side rail and a plurality of rungs which extend between the first and second side rails, each rung having two ends, wherein the first and second side rails each has a generally rectangular shape in cross-section and comprise a first C-shaped section member and a second C-shaped section member secured together in face-to-face relation with said section members, said section members each has a flat body portion forming opposing sides of the side rail, and one of the two ends of each of said rungs extending entirely through each of the first and second side rails via a series of pairs of aligned openings in the flat body portions of the respective first and second section members of each side rail;

said method comprising:

(1) manufacturing the first side rail by the steps of:

(a) while retaining said first and second section members against movement relative to one another in a back-to-back relation with said flat body portions abutting one another and supporting the flat body portions on a flat surface, forming the pairs of aligned openings through the flat body portions of the first and second section members, such that the aligned openings of each one pair are formed simultaneously, and (b) releasing said first and second section members from back-to-back relation and assembling said first and second section members in said face-to-face relations with the openings of each one pair aligned to form the first rectangular side rail;

(2) manufacturing the second side rail by the steps of:

(a) while retaining said first and second section members against movement relative to one another in a back-to-back relation with said flat body portions abutting one another, and supporting the flat body portions on a flat surface, forming the pairs of aligned openings through the flat body portions of the first and second section members such that the aligned openings of each one pair are formed simultaneously and (b) releasing said first and second section members from back-to-back relation and assembling said first and second section members in said face-to-face relation with openings of each one pair aligned to form the second rectangular side rail; and (3) assembling said box ladder by inserting the two ends of the rungs through the pair of the aligned openings in each of said assembled first and second side rails.

2. The method according to claim 1 further including the step of swaging the two ends of said rung for securing the rung to the body portions of the side rails.

3. A method as claimed in claim 1 wherein said rungs and said openings are of non-cylindrical form.

4. A method according to claim 3 wherein said openings are D-shaped.

5. A method according to claim 3 wherein said openings are triangular-shaped.

6. A method according to claim 3 wherein said openings are rhomboidal-shaped.

7. A method according to claim 3 wherein said first section member has integrally formed supporting ribs which provide structural support to said side rail and said box ladder.

8. A method according to claim 7 wherein each of said first section member and said second section member has a pair of arms wherein said arms of said first section member has a pair of integrally formed fingers provided with barbs and adapted to receive in mating engagement the corresponding arm of said second section member having corresponding barbs.

9. A method according to claim 1 wherein said openings are formed by stamping.

10. A method as claimed in claim 1 wherein each of said first and second C-shaped section members has its flat body portion centrally between two end arms.

11. A method as claimed in claim 10 wherein said end arms of the first section member engage the end arms of the second section member to couple the first and second section members together.

12. A method as claimed in claim 11 wherein the first section member includes a supporting rib located between one end arm and the openings and extending to engage the second section member.

13. A method as claimed in claim 10 wherein said first and second section members comprise aluminum extrusions.

14. A method as claimed in claim 11 wherein said rungs are of a non-cylindrical shape.

15. A method as claimed in claim 11 wherein each of said arms of said first section member has a pair of integrally formed fingers which define a slot, which slot receives in mated engagement a corresponding arm of said second section member.

* * * * *